United States Patent [19]

Hinkle

[11] Patent Number: 4,507,837

[45] Date of Patent: Apr. 2, 1985

[54] EXTRACTOR TOOL

[75] Inventor: Donald H. Hinkle, Reading, Pa.

[73] Assignee: Dana Corporation, Toledo, Ohio

[21] Appl. No.: 512,305

[22] Filed: Jul. 11, 1983

[51] Int. Cl.$^{3}$ .............................................. B23P 19/04

[52] U.S. Cl. .......................................... 29/262; 29/265

[58] Field of Search ................. 29/256, 258, 259, 260, 29/261, 262, 263, 265

[56] References Cited

U.S. PATENT DOCUMENTS

| | | | |
|---|---|---|---|
| 736,991 | 8/1903 | Matthews | 29/265 |
| 1,429,567 | 9/1922 | Carlisle | 29/262 |
| 1,632,720 | 6/1927 | Worster | 29/262 X |
| 1,670,574 | 5/1928 | Howell . | |
| 1,763,331 | 6/1930 | Stephenson | 29/262 |
| 2,380,068 | 7/1945 | Patton . | |
| 2,614,318 | 10/1952 | McCord . | |
| 3,479,722 | 11/1969 | Maness . | |
| 3,588,983 | 6/1971 | Hoy . | |
| 3,611,540 | 10/1971 | Gibu . | |

FOREIGN PATENT DOCUMENTS

| | | | |
|---|---|---|---|
| 2629976 | 1/1978 | Fed. Rep. of Germany | 29/256 |
| 339754 | 12/1930 | United Kingdom | 29/262 |

*Primary Examiner*—Frederick R. Schmidt
*Assistant Examiner*—Steven P. Schad
*Attorney, Agent, or Firm*—Harold D. Shall

[57] ABSTRACT

An extractor tool for removing a die button from an opening in a die block into which the button has been securedly pressed. The die button has an axial opening therethrough. The tool includes a hollow expandible extractor insertable into and through the opening in the button and having spaced legs at the engaging end thereof. The spaced legs of the extractor are forced outwardly into firm engagement with the die button upon movement into the hollow extractor of an expansion pin. Both the expandible extractor and the expansion pin are threaded to an extractor sleeve which is received through a central opening in a spacer. The spacer is of substantially hollow cup shape and is adapted to engage the top of the die block surrounding the die button and receive the die button upon its extraction from the die. A nut is threaded on the circumference of the expansion sleeve and engages the top of the spacer and upon tightening of the nut, the expansion sleeve moves away from the die block and pulls the extractor and the expansion pin therewith to thereby pull the die button from the die block.

1 Claim, 2 Drawing Figures

EXTRACTOR TOOL

BACKGROUND OF THE INVENTION

This invention relates to extraction tools in general and more specifically to an extraction tool adapted to remove a die button, bushing or the like, which have an opening therein, from an opening in a member which is securely receiving the button.

Extractor tools with an expandible extractor and a cooperating expansion pin are old and well known. Many of these extractors are hollow and have opposed legs, the extremity thereof being provided with shoulders, where the legs are expanded outwardly by relative axial movement of the expansion pin to move the shoulders into engagement with the part to be extracted. Thereafter the extraction tool is manipulated to withdraw the part to be extracted. Some of these prior art devices include a pushing member to provide a withdrawing force; in these, the extractor and expansion pin are both hollow, and the pushing member then extends through both the extractor and expansion pin and also the part to be extracted. The pushing member must then have some reactive surface within or below the part to be extracted to provide an extraction force. Absent the reactive surface located as described, the devices will not operate as designed.

Other prior art extraction tools include the expandible extractor and an expansion pin, but do not have pushing members to provide an extraction force, but, rather, rely on manual pulling of the extraction tool or a hammering mechanism or the like and, therefore, are not desirable.

SUMMARY OF THE INVENTION

Die buttons having central openings therein are characteristically inserted into openings in die blocks with an interference fit of approximately 0.002 inches. The die button is generally used in the perforation of metals or plastics by inserting the work piece between the die button and punching a piece of the work piece through the central opening in the die button by the reactive force of a punch, to form a hole in the work piece.

Periodically, the die button must be removed from the die for replacement for size or due to damage or to be sharpened. With many prior art procedures, the die must be removed from the machine tool, for example a punch press, and partially disassembled to partially or completely remove the die block containing the button and knocking the button out of the top of the die block by inserting a knock-out or drift through the bottom of the die opening in which the button is pressed.

The extractor tool of the present invention allows removal of the die button from the top of the die block without disassembly of the major die elements or sections. This extractor tool works from the top of the die button and eliminates the need to have a reactive surface provided within or below the part, such as the die button, to be removed, as is required by many prior art devices.

The tool of this invention comprises an expandible extractor and a cooperating expansion pin both of which are threaded to internal bores of an extraction sleeve. Since these are threaded engagements, the pin, the extractor and the sleeve may be changed to accomodate buttons of various sizes. A spacer, which can also be interchanged and which is of substantially hollow cup shape on its bottom side, engages the top of the die block at a location surrounding the die button, so that upon the button being pulled from the die, it moves into the opening in the spacer. The periphery of the extraction sleeve is threaded and passes through an opening in the spacer and a loading member, such as a nut, is threaded on the extraction sleeve.

In operation, the extractor is pushed through the opening in the die button, the extractor pin is then threaded inwardly of the extractor sleeve to spread the legs and shoulders of the extractor into engagement with the button. Tightening of the nut while holding the extractor sleeve against rotation, moves the extractor sleeve, the extractor and the expansion pin upwardly from the die block to thereby withdraw the die button from the die block.

DESCRIPTION OF A PREFERRED EMBODIMENT

Figure 1:
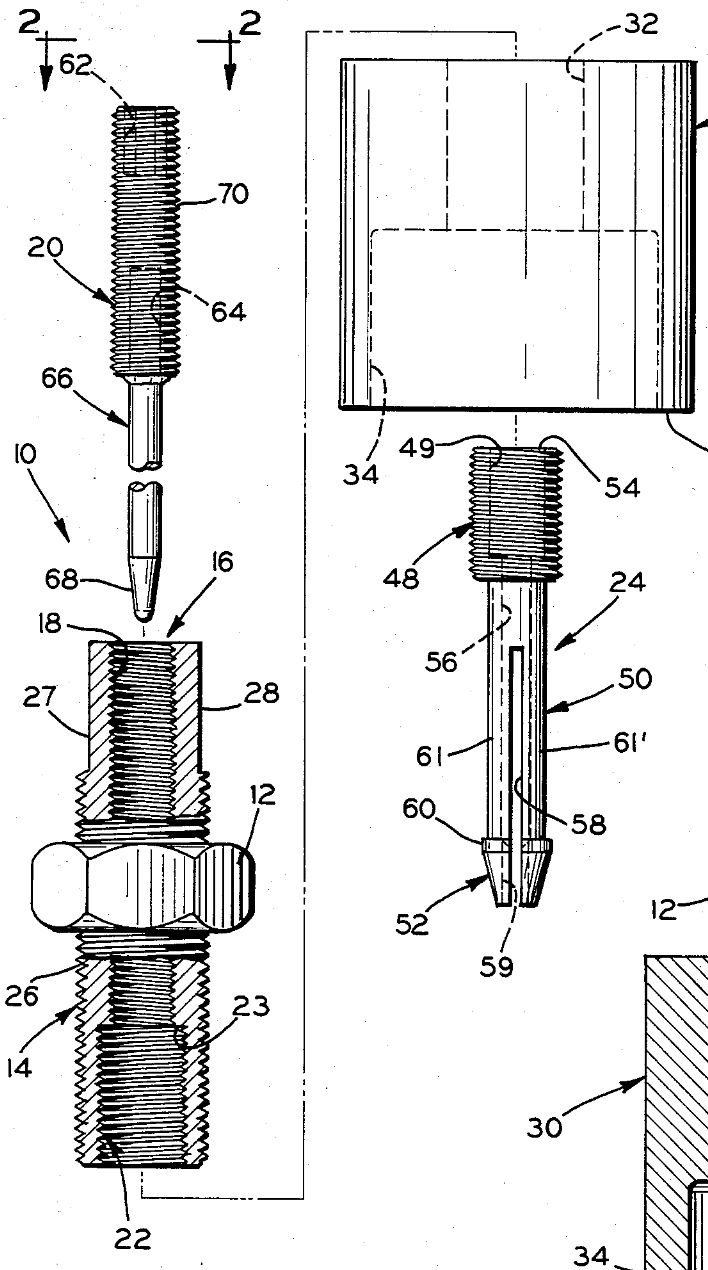
FIG. 1 is an exploded front elevational view of an extraction tool according to this invention with the various parts spaced and ready to be assembled except for the loading nut which is shown threaded on the periphery of the extractor sleeve, which sleeve is shown in vertical cross section.

An extraction tool 10 according to this invention is shown in its disassembled condition in FIG. 1, except that a thrust nut 12 is shown mounted on an extractor sleeve 14.

The extractor sleeve 14 is generally cylindrical in shape and has a two sized threaded bore 16 therein. An upper portion which is approximately two-thirds of the bore 16 is shown by the number 18. This upper portion 18 has an internal right hand thread which is adapted to threadedly receive an expansion pin shown generally at 20. A lower portion which is approximately one-third of the bore 16 is shown by the number 22. This lower portion 22 has an internal left handed thread which is adapted to threadedly receive an extractor shown generally at 24. The junction between the upper bore 18 and the lower bore 22 provides a downwardly facing shoulder 23.

The outer surface 26 of the extractor sleeve 14 is threaded for the full length thereof with a right hand thread, and is uniform except for a pair of diametrically opposed flat surfaces 27 and 28 formed on the upper end thereof; the length of the flat surfaces 27 and 28 is sufficient to be grasped by a wrench not shown, during the operation of the tool.

Figure 2:
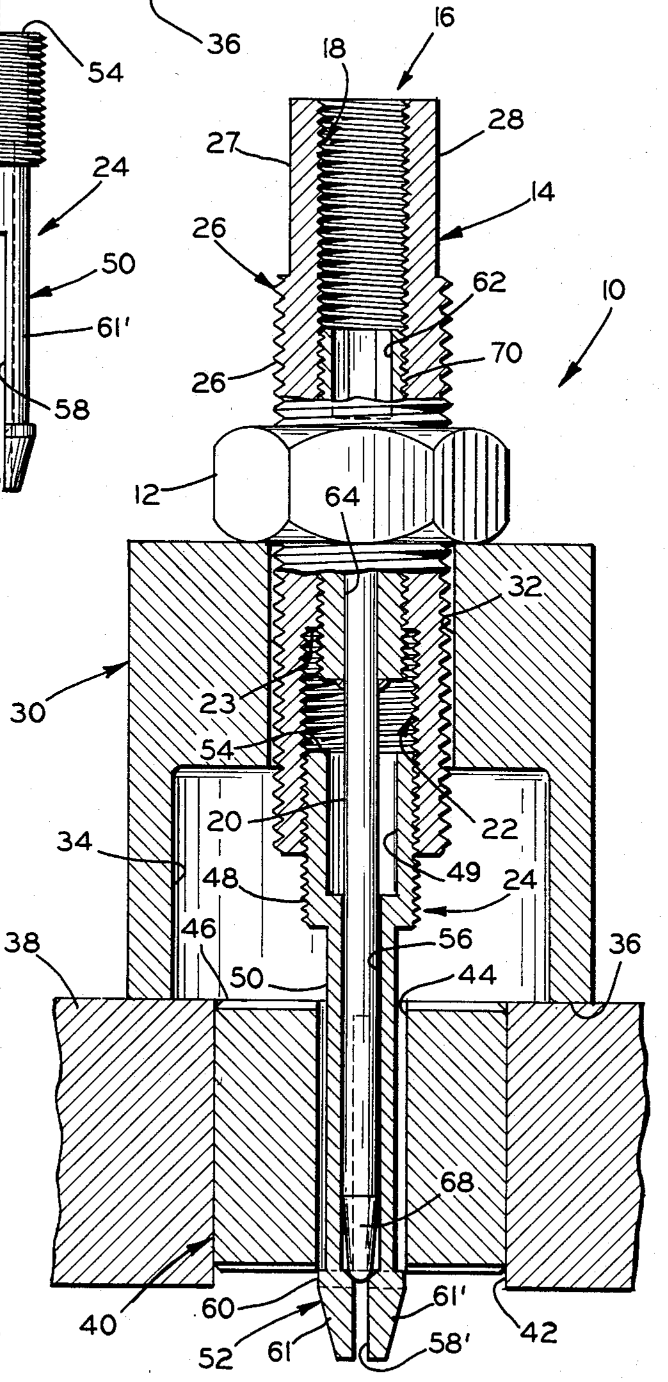
FIG. 2 is a cross sectional view of the assembled extraction tool of FIG. 1, which section is taken in the direction of the arrows 2—2 of FIG. 1; the assembled tool being shown mounted on a die button and die block. The nut and the lower end of the expander pin are shown in full lines.

A spacer 30 is shown in FIG. 1 disposed below the sleeve 14 and has an upper central bore 32 which is sized to receive the sleeve 14 for rotary and axial movement in a supportive manner. This upper bore 32 is smooth and not threaded. The spacer 30 has a lower bore 34, which, as seen in FIG. 2, is longer than upper bore 32, provides a lower shoulder 36 and is adapted to engage the upper surface of a die block, shown fragmentarily at a location 38, spaced radially outwardly of a die button 40, which button is received in a die opening 42 in a light pressed-fit relationship of about two thousandths of an inch. The die button 40 has a central bore 44, and an upper surface 46, and the intersection of the bore 44 and upper surface 46 act as a cutting edge when a punch (not shown) pierces through a work piece (not shown) to provide an opening in the work piece. The pierced matter is ejected from the bottom of the die button and out of the machine tool, not shown. Since the die block 38 is mounted in the machine tool, not shown, there is normally no way to get to the bottom of the die block to knock the button 40 upwardly and out of the die block. While the top of the button 40 is accessible, it is not practical to force it down through the die block for replacement. The button 40 is removed for sharpening of the junction of the opening 44 and upper surface 46 of the button or to insert a button with a different size opening 44, or to merely replace the button.

It is apparent from FIG. 2 that the spacer 30 will accommodate buttons of larger or smaller diameter than that shown. In the event the button had a diameter larger than the bore 34, the same extractor sleeve 14 could be used with a different spacer with the same size upper bore 32 and a larger size lower bore 34. If the button had a height higher than the bore 34, a spacer with a deeper bore 34 could be used with the same extractor sleeve 14.

Referring again to FIG. 1 shown below the spacer 30 is the extractor 24 which has an upper enlarged end 48 from which depends a hollow cylindrical portion 50, which is smaller in diameter than the upper end 48 and a lower enlarged tip 52 which is larger in diameter than the portion 50. The upper end 48 is provided with a bore 49 which is cylindrical. Its purpose will be explained later.

Referring to FIGS. 1 and 2, the upper end 48 is provided with an external left hand thread, which, when the tool is fully assembled is threadedly received in the lower threaded portion of bore 22 and can be threaded into such bore until the upper end 54 of the enlarged end 48 abuts against the downwardly facing shoulder 23, or abuts against the expander pin 20, in which later case, the bore 49 will be able to receive a weldment shown at the expander pin.

The hollow cylindrical portion 50 has a central bore 56 which extends from the bore 49 to the lower end of the cylindrical portion 50 wherein it terminates in a conical shoulder, whose apex points downwardly, at the junction of the cylindrical portion and the lower enlarged tip 52. A slightly smaller cylindrical bore 59, shown in phantom in FIG. 1, extends from the conical shoulder and downwardly to the end of the enlarged tip 52. A pair of diametrically opposed axially extending slots 58—58′ extend inwardly from the lower end of the extractor 24. The slots 58—58′ extends from the lower end of the enlarged tip 52 up the cylindrical portion. In a particular size extractor, with a tip three-eighths inches long and a cylindrical portion one and one-half inches long, a pair of opposed slots 58—58′ were cut with a one-sixteenth inch saw blade, which slot had a total length of one and one-half inches measured from the lower end of the extractor 24, to provide a pair of opposed spring legs 61—61′.

The enlarged tip 52 is of truncated conical shape and has a shoulder 60 at the upper end thereof. The shoulder 60 is preferably about ten thousandths of an inch larger than the opening 44 in the die button 40, while the cylindrical portion 50 is somewhat smaller.

The opposed slots 58—58′ provide a spring action to the extractor 24 so that the enlarged end 52 can be forced through the opening 44 in the die button 40 even though the shoulder 60 is about 0.010 inches larger than the opening 44. It is readily apparent that as with the spacer 30 interchangability, the same extractor sleeve 14 could be used with extractors 24 of various lengths and with shoulders 60 of different diameters.

Referring to FIG. 1, the expansion pin 20 which is shown above the extractor sleeve 14, includes an upper cylindrical portion 70 which is threaded for the full length thereof with a thread which mates with the upper threaded portion of the extractor sleeve 14. In FIG. 2, it is seen that the extractor pin 20 is threaded into the bore 18 until the lower end of threaded portion 70 extends below the bore 18; however, it need not be threaded inwardly that far if desired.

The top of cylindrical portion 70 is provided with a hexagonal shaped opening 62 into which can be inserted a conventional long shanked "Allen" wrench for rotating the expansion pin 20 into and out of the extractor sleeve 14. The lower end of the cylindrical portion 70 of the pin 20 is provided with a central bore 64 into which is placed and then secured as by welding, a depending cylindrical rod 66; the lower end 68 thereof being of a rounded tip conical shape. The end 68 is adapted to be received by the conical shoulder at the lower end of central bore 56 and then into smaller cylindrical bore 59 of extractor 24 to thereby expand the enlarged tip 52.

In operation, the tool is assembled as shown in FIG. 2, and the extractor 24 is slid into the die button 40 until the lower enlarged tip extends below the bottom of the button 40. An "Allen" wrench is then inserted into the hexagonal opening 62 in expansion pin 20 and the pin 20 turned clockwise until the lower end 68 thereof expands the enlarged tip 52 into tight engagement with the button 40. It should be noted that during this tightening, because of the left hand thread connection between the extractor 24 and the extractor sleeve 14, the extractor will not tend to screw out of the extractor sleeve and thereby inhibit tightening. Rather, the left hand thread will tend to cause the extractor 14 to screw into the sleeve 14 to thereby enhance tightening.

Once the enlarged tip 52 is secured to the die button 40, the extractor sleeve is held against rotation by grasping the opposed flats 27 and 28 with a suitable tool, such as an end wrench, and the thrust nut 12 is turned clockwise (when viewed from above) to thereby screw the extractor sleeve 14 upwardly relative to the spacer 30 and withdraw the die button into the bore 34 of the spacer and out of the die block 38.

Once the button is out of the block, the expansion pin 20 is screwed upwardly relative the extractor 24 removing the spreading force from the lower end of the extractor 24. The lower enlarged tip can then be compressed with a suitable device, such as a pair of pliers and the extractor withdrawn from the die button 40.

Although the above description relates to a presently preferred embodiment, numerous modifications may be made without departing from the spirit or scope of the invention as defined in the following claims.

What is claimed is:

1. An extractor tool for extracting an annular element, having an annular bore therein, outwardly from the top of a receiving opening in a supporting member, which receiving opening is surrounded by an upper supporting surface of the supporting member, comprising, a spacer member having a radially extending base with an axially extending opening in said base and from which base depends axially extending shoulder means, said shoulder means defining a space large enough to receive the annular element between the shoulder means and said base and with the lower end of said shoulder means being engageable with the upper surface of the supporting member at locations radially outwardly of the annular element, an axially elongated extractor sleeve slidably received in said axially extending opening in said base, said sleeve having a central threaded bore extending axially therethrough and said bore having an upper and a lower portion with the threads in said upper bore portion of said extractor sleeve being of an opposite hand from said threads in said lower bore portion thereof, threads on the outer surface of said extractor sleeve being of the same hand as the threads in said upper portion in said bore of said sleeve, a hollow extractor member with a threaded upper end threaded in said lower bore portion, said extractor member having an elongated lower end with a pair of expandible legs and said lower end being adapted to be received within the axial bore of the annular element, an expansion member having an upper threaded portion threaded in the upper bore portion of said sleeve and having an elongated depending portion extending into said hollow extracting element, said expansion member including means on its lower end for expanding the lower end of said extractor member radially outwardly upon said expanding member being threaded axially into said sleeve, sao that when said lower end of said extractor member is within the bore of the annular element, said expander member can be operated for causing engagement therebetween, and forcing moving means operable between said extractor sleeve and said spacer member for moving said extractor sleeve axially outwardly relative to said spacer member to withdraw the annular element from the supporting member, said moving means comprising threads on the outer surface of said extractor sleeve, a nut means threaded on said outer surface of said extractor sleeve, with the lower surface of said nut means engaging the upper surface of said base of said spacer member, and means on said sleeve for cooperating with a holding means to prevent rotation of said sleeve, whereby upon rotation of said nut means while said extractor sleeve is held against rotation, outward movement of said sleeve relative to said spacer member occurs, said threads on the outer surface of said extractor sleeve are the same hand as the threads in said upper portion of said bore of said sleeve whereby if rotation of said nut means to cause outward rotation of said sleeve causes rotation of said sleeve, said expander is further tightened in said sleeve, said elongated lower end of said extractor member comprises a cylindrical portion secured to and extending downwardly from said threaded upper end of said extractor member and a knob means on the lower end of said cylindrical portion, said cylindrical portion being smaller in diameter than the bore in the annular element and said knob means being slightly larger in diameter than the bore in the annular element, said extractor element being long enough whereby said knob means will project below the annular element when the tool is mounted thereon, and upon expansion of said lower end of said extractor member, said knob means engages the lower surface of the annular member, said extractor member has concentric bores in said threaded upper end and elongated lower end thereof, said bore in said knob means of said lower end being of smaller diameter than said bore in the remainder of the cylindrical portion thereof, said expandible legs are formed by a pair of axial slots formed in said elongated lower end and extending up through the knob means and partially up the cylindrical portion, and said elongated depending portion terminates at its lower end in a rounded conical end which expands said extractor member upon entering the junction of the bores in said knob means and cylindrical portion.

* * * * *